Patented Mar. 11, 1941

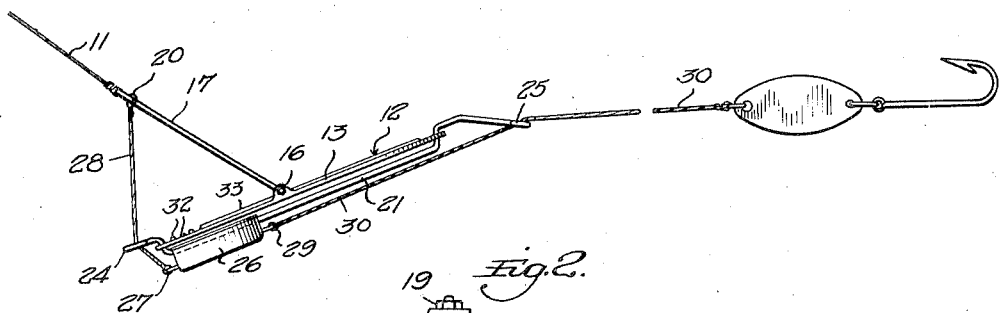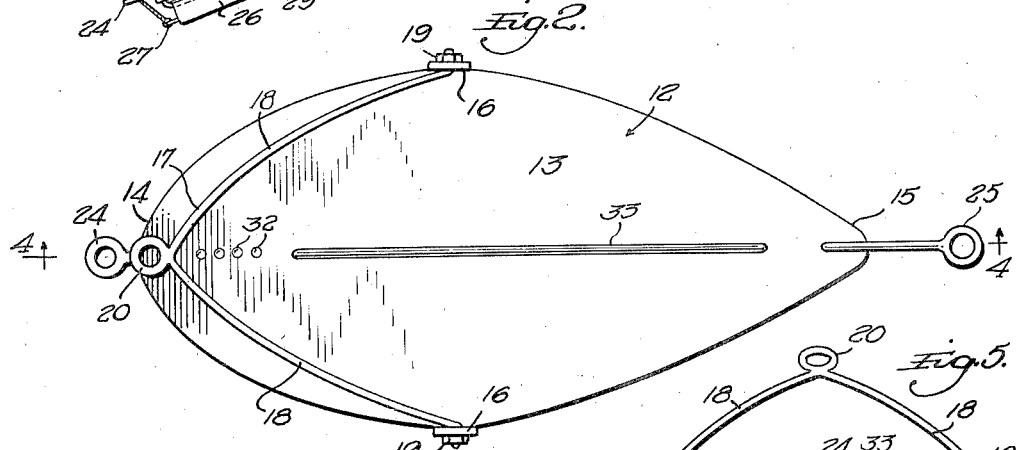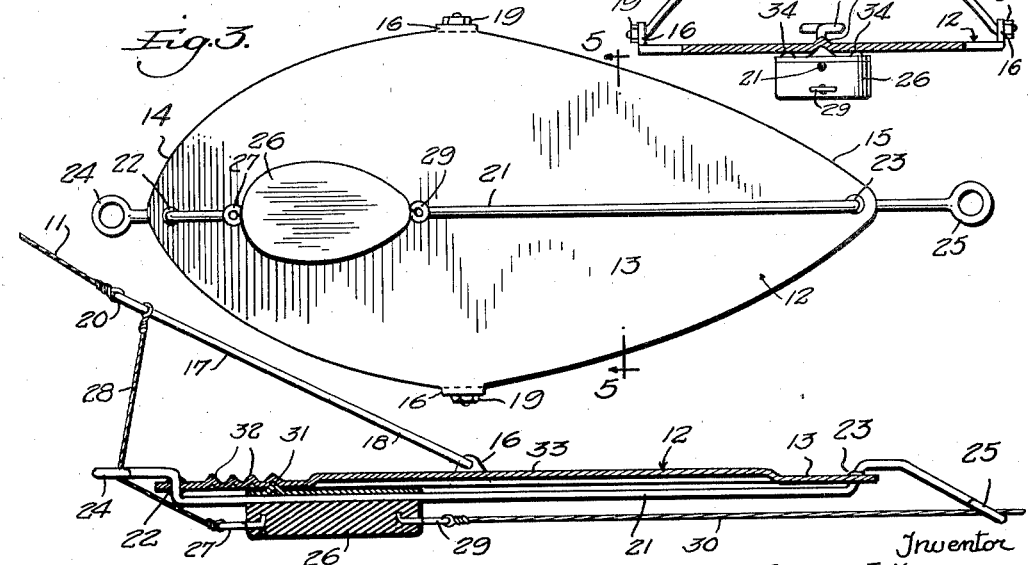

2,234,943

UNITED STATES PATENT OFFICE 2,234,943

TROLLING DEVICE

Gustave E. Nyman, Tacoma, Wash.

Application May 23, 1939, Serial No. 275,273

9 Claims. (Cl. 43—52)

This invention relates to a trolling device and more particularly to a device which will eliminate the necessity of using heavy lead sinkers in deep water fishing.

In fishing for salmon, marlin, tuna, and other deep water fish, the usual practice is to use heavy lead sinkers in order that the bait carried at the end of the trolling line will be submerged at a proper depth beneath the surface of the water. As the speed of the boat carrying the trolling lines is increased, it is necessary to increase the weight of the sinker. In commercial fishing, many of such sinkers are lost due to their being caught on obstacles in the water or to the action of the fish after taking the bait. Obviously, it is desirable to avoid the loss of the sinkers wherever possible. Moreover, in sport fishing with light tackle, it is customary to slip the lead sinkers thereby releasing the line of considerable weight in order that the fishermen will enjoy the most sport in landing the fish.

The principal object of this invention is to provide a light weight trolling device which will perform the functions of the conventional lead sinkers and eliminate the disadvantages thereof.

A further object is to provide a trolling device having a light and substantially flat sheet metal body member which may be attached at an adjustable angle to a trolling line whereby it will be effective to submerge itself at a desired depth below the surface of the water.

A further object is to provide a trolling device wherein the depth to which the device will be submerged below the surface of the water will be dependent upon the angle at which the flat sheet metal body member is held with respect to the trolling line and the speed at which the device is travelling through the water.

A further object is to provide a trolling device of the character referred to having novel means for effecting movement of the body member to a position substantially in alignment with the trolling line thereby eliminating the drag of the device on the trolling line whenever a retarding load is encountered such as occurs when the bait is taken by a fish, the flat body of the device causing it to "plane" upwardly toward the boat.

Other objects and advantages of the invention will become apparent during the course of the following description.

In the drawing I have shown one embodiment of the invention. In this showing:

Figure 1 is an elevational view showing the relative position which the parts will occupy in the water with respect to a trolling line, Figure 2 is a top plan view, Figure 3 is a bottom plan view, Figure 4 is a sectional view taken substantially on line 4—4 of Figure 2, and, Figure 5 is a sectional view taken substantially along the line 5—5 of Figure 3.

Referring to the drawing, the numeral 11 indicates a trolling line attached to a trolling device indicated as a whole by the numeral 12. The trolling device 12 comprises a substantially flat body member 13 provided with a front end portion 14 and a rear end portion 15. The body member 13 is provided with a pair of lugs 16 formed on the edges thereof at points located substantially intermediate the end portions 14 and 15. The width of the body member between the lugs 16 is preferably less than the length of the body member. A yoke 17 having a pair of substantially rigid arms 18 is provided for connecting the trolling line 11 to the body member 13. Each of the arms 18 is pivotally connected to one of the lugs 16 by being turned outwardly therethrough and each is provided with a nut 19. The yoke 17 is provided with an eyelet 20 located centrally of the arms 18 to which the trolling line may be tied.

In order to control the angular position of the yoke 17 with respect to the body member 13, a guide rod 21 is secured longitudinally of the body member 13 by suitable means such as soldering at points 22 and 23. The portion of the guide rod 21 between the points of connection 22 and 23 is spaced from and parallel to the body member 13 and is preferably located on the underside of the body member 13. The guide rod 21 is provided with eyelets 24 and 25 preferably spaced beyond the respective end portions 14 and 15 of the body member 13 for a purpose to be described.

A counterweight 26 is slidably mounted on the rod 21 for movement longitudinally of the body member 13. The front end of the counterweight 26 is provided with an eyelet 27 and is connected to the yoke 17 by a line 28 which is threaded through the eyelet 24 and has its ends tied to the eyelets 20 and 27. The rear end of the counterweight 26 is provided with an eyelet 29 which is connected to a bait or fish hook by the bait line 30 which is threaded through the eyelet 25 and has an end tied to the eyelet 29.

The upper surface of the counterweight 26 is provided with a projection 31 engageable in notches 32 for adjustably locating the position of the counterweight 26. The connection 22 of the guide rod 21 to the body member 13 provides an abutment limiting forward movement of the counterweight 26. The connection 23 similarly provides an abutment limiting rearward movement of the counterweight 26. The body member 13 is provided with a groove 33 in which the raised portion 31 is slidable thereby permitting free movement of the counterweight 26 along the rear end of the body member 13 without frictional interference from the raised member 31. Buttons 34 are provided on the upper surface of the counterweight 26 and slidably contact the under surface of the body member 13 in order that the counterweight 26 will be maintained in a proper position during movement thereof longitudinally of the body member 13.

It will be apparent in the above construction that the angular arrangement of the yoke 17 with respect to the body member 13 will be dependent upon the length of the line 28 which is tied to the eyelets 20 and 27 and upon the position of the counterweight 26 carrying the eyelet 27. It will also be apparent that when the counterweight 26 is moved rearwardly with respect to the body member 13, the latter will be pivotally moved with respect to the yoke 17 to a position in alignment with the yoke 17.

When the trolling device 12 is attached to the trolling line 11 and pulled through water by a boat or launch, the depth at which it will be submerged below the surface of the water will depend upon the angular position of the yoke 17 with respect to the body member 13 and the speed of the launch. Since the angular position of the yoke 17 with respect to the body member 13 is partly dependent upon the length of the line 28, this length is made to suit the speed of the boat carrying the trolling line in order to secure the proper depth of submersion. For a line 28 of given length, adjustments may be made by changing the position of the projection 31 on the counterweight 26 with respect to the notches 32. Obviously, a change in the relative position of the counterweight 26 will effect a change in the angular position of the yoke 17 with respect to the body member 13. The exact positions of the parts may readily be determined for various trolling speeds by a few experiments.

After the device is inserted in the water, the resistance of the body member 13 to forward movement will take up the play in the line 28 and the body member 13 will assume an angular position with respect to the yoke 17 and trolling line 11 substantially as shown in Figure 1. In such position, the force of the water sliding over the body member 13 will exert a downward force which will carry the trolling device 12 below the surface of the water and exert a dragging force on the trolling line 11 in much the same manner as a heavy lead sinker. It will be apparent that the center of gravity of the device 12 will be located forwardly of the lugs 16 thereby tending to keep the front end of the device 12 pointed downwardly with respect to the surface of the water to maintain the device at the desired trolling depth.

The normal drag of the bait through the water will be transmitted through the bait line 30 to the counterweight 26. Such force will tend to move the counterweight 26 rearwardly of the body member 13. However, movement of the counterweight 26 by the drag of the bait will be resisted by the frictional engagement of the projections 31 in the notches 32.

When a fish takes the bait and attempts to get away, a retarding pull will be exerted on the bait line 30 which will exert a downward force on the eyelet 25 and at the same time will transmit a retarding pull to the counterweight 26. The resilience of the guide rod 21 will permit the projection 31 to be cammed out of engagement with the notches 32 to move the counterweight rearwardly of the body member 13. It will be apparent that such movement of the counterweight 26 will be transmitted to the line 28 which, acting upwardly against the eyelet 24, will cause the forward end of the body 13 to be pulled upwardly to a position substantially in alignment with the yoke 17. Moreover, as the counterweight 26 moves rearwardly of the body member 13, the center of gravity of the device 12 will be shifted rearwardly of the lugs 16 thereby removing the tendency of the front end 14 to point downwardly with respect to the surface of the water.

After the body member 13 has been moved to a position substantially in alignment with the yoke 17, the drag of the device 12 will be substantially eliminated and the effect will be somewhat the same as would be present in those cases where the conventional lead sinker is released from the trolling line. The upward tilting of the forward end of the body 13 causes the device to "plane" toward the surface of the water. Accordingly, in sport fishing with light tackle, the fisherman will have the full benefit of landing the fish without tiring the fish with a heavy lead sinker or the necessity of slipping a conventional lead sinker from the trolling line.

It will be apparent that the construction of the device 12 provides a simple and efficient means of eliminating the necessity of using a heavy lead sinker in trolling for deep water fish. Moreover, the device 12 provides means whereby the pull of a fish on the bait line 30 will positively effect movement of the parts of the device to a position substantially in alignment with the trolling line 11 thereby eliminating the drag of the device on the line 11.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a substantially flat body member, a connecting member pivotally connected to said body member and to which a trolling line is attachable, and means movable with respect to said body member to shift the center of gravity of the device to at least partially control the angular position of said connecting member with respect to said body member.

2. A device of the character described comprising a substantially flat body member, a connecting member pivotally connected to said body member and to which a trolling line is attachable, means movable with respect to said body member to shift the center of gravity of the device to at least partially control the angular position of said connecting member with respect to said body member, and means carried by said body member and adapted for connection with a bait line whereby said body member will be moved to a position substantially in alignment with said connecting member when the bait line is subjected to a retarding load.

3. A device of the character described comprising a substantially flat body member, a connecting member pivotally connected to said body member intermediate the ends thereof, means for attaching a trolling line to said connecting member, and means including a member movable with respect to said body member to shift the center of gravity of the device and normally effective for at least partially controlling the angular position of said connecting member with respect to said body member, said last named means being attachable to bait-carrying means line and connected to move said body member to a position substantially in alignment with said connecting member when the bait line is subjected to a retarding load.

4. A device of the character described comprising a substantially flat body member, a connecting member pivotally connected to said body member intermediate the ends thereof, means for attaching a trolling line to said connecting member, a weight member movable relative to said body member and to which a bait line is attachable, and means limiting movement of said movable member in one direction to control the normal position of said connecting member with respect to said body member, said weight member being movable in the opposite direction upon encountering a retarding load on the bait line to shift the center of gravity of the device and to effect movement of said body member to a position substantially in alignment with said connecting member.

5. A device of the character described comprising a substantially flat body member, a connecting member pivotally connected to said body member intermediate the ends thereof, means for attaching a trolling line to said connecting member, a member mounted for movement longitudinally of said body member, and a line connecting said movable member and said connecting member and having sliding engagement with the forward end of said body portion, said movable member being attachable to a rearwardly extending bait line and said body member adjacent its rear end being constructed for sliding engagement with the bait line, said movable member normally occupying a position adjacent the forward end of said body member and being operable in such position to control the angular position of said connecting member relative to said body member, said bait line being operative to move said movable member rearwardly of its normal position to effect movement of said body member to a position substantially in alignment with said connecting member when subjected to a retarding load.

6. A device of the character described comprising a substantially flat body member, a guide rod secured to and extending longitudinally of said body member, a connecting member pivotally connected to said body member intermediate the ends thereof, means for attaching a trolling line to said connecting member, a weight mounted for movement longitudinally on said guide rod, a connecting line attached to said weight and said connecting member and having a sliding connection with the front end portion of said body member, said weight normally occupying a position on said guide rod adjacent the front end thereof and controlling the angular position of said connecting member through said connecting line, and a bait line secured to said weight and having a sliding connection with the rear end portion of said body member, said bait line being operative when subjected to a retarding load to move said weight and connecting line rearwardly and thereby effect movement of said body member to a position substantially in alignment with said connecting member.

7. A device of the character described comprising a substantially flat body member, a yoke pivotally secured to said body member intermediate the ends thereof, means for attaching a trolling line to said yoke, connecting means secured to said yoke and having a slidable connection with the front and rear portions of said body member, and means limiting relative movement of said connecting means in one direction with respect to said body member for controlling the angular position of said yoke with respect to said body member, said connecting means being movable in the opposite direction when subjected to a retarding load to effect movement of said body member to a position substantially in alignment with said yoke.

8. A device of the character described comprising a substantially flat body member, a guide rod secured to said body member adjacent opposite ends thereof and extending longitudinally thereof, a yoke pivotally secured to said body member intermediate the ends thereof, means for attaching a trolling line to said yoke, a weight mounted for longitudinal movement on said guide rod, a connecting line attached to said weight and said yoke and having a sliding connection with the front end portion of said body member, means limiting movement of said weight in one direction thereby controlling the angular position of said yoke with respect to said body member through said connecting line, and a bait line secured to said weight and having sliding connection with the rear end portion of said body member, said weight being movable in the opposite direction by said bait line when subjected to a retarding load thereby effecting movement of said body member to a position substantially in alignment with said rigid member.

9. A device of the character described comprising a substantially flat body member, a yoke pivotally secured to said body member intermediate the ends thereof, means for attaching a trolling line to said yoke, connecting means secured to said yoke and having a slidable connection with the front and rear portions of said body member, and means limiting relative movement of said connecting means in one direction with respect to said body member for controlling the angular position of said yoke with respect to said body member, said connecting means being movable in the opposite direction when subjected to a retarding load to effect movement of said body member to a position substantially in alignment with said yoke, said connecting means comprising a weight movable to shift the center of gravity of the device upon movement of said connecting means in the last named direction to tend to cause said body member to plane upwardly.

GUSTAVE E. NYMAN.